US006994201B2

(12) United States Patent
Yu et al.

(10) Patent No.: US 6,994,201 B2
(45) Date of Patent: Feb. 7, 2006

(54) BILL ACCEPTOR

(75) Inventors: Cheng-Kang Yu, Taipei (TW); Wen-Yuan Tsai, Taipei (TW)

(73) Assignee: International Currency Technologies Corporation, Taipei (TW)

( * ) Notice: Subject to any disclaimer, the term of this patent is extended or adjusted under 35 U.S.C. 154(b) by 256 days.

(21) Appl. No.: 10/600,755

(22) Filed: Jun. 23, 2003

(65) Prior Publication Data

US 2004/0256196 A1 Dec. 23, 2004

(51) Int. Cl.
*G06K 7/12* (2006.01)

(52) U.S. Cl. ...................... 194/207; 194/302; 209/534; 209/577; 209/587; 250/556

(58) Field of Classification Search ................ 194/207, 194/302, 350; 209/534, 576, 577, 578, 587; 250/334, 556

See application file for complete search history.

(56) References Cited

U.S. PATENT DOCUMENTS 3,340,978 A * 9/1967 Haville ....................... 194/207
3,618,765 A * 11/1971 Cooper et al. .............. 209/534
5,915,518 A * 6/1999 Hopwood et al. .......... 194/207
6,075,587 A * 6/2000 Shiau .......................... 356/71

* cited by examiner

*Primary Examiner*—Donald P. Walsh
*Assistant Examiner*—Mark J. Beauchaine
(74) *Attorney, Agent, or Firm*—Rabin & Berdo, P.C.

(57) ABSTRACT

A bill acceptor is constructed to include a housing, the housing having a base for holding a banknote for examination, a first light emitter adapted to emit infrared light onto the banknote carried on the base of the housing for examination, a second light emitter adapted to emit ultraviolet light onto the banknote for visual examination, an image sensor adapted to pick up infrared light reflected from the banknote carried on the base of the housing and to convert received light signal into image signal, and a display adapted to display image signal obtained from the image sensor for verifying the authenticity of the banknote.

12 Claims, 7 Drawing Sheets

BILL ACCEPTOR

BACKGROUND OF THE INVENTION

1. Field of the Invention

The present invention relates to bill acceptors and, more particularly, to such a bill acceptor, which uses infrared light to fetch the image of inks of the bill to be examined and ultraviolet light to scan fluorescent fibers of the bill, enabling the user to verify the authenticity of the bill accurately.

2. Description of the Related Art

Fast development of high technology greatly improves our living standard. However, there are people using high-tech products as tool to make illegal acts, for example, to print counterfeit bills. People usually verify the authenticity of a banknote by touching or visual examination. It is difficult to verify the authenticity of a banknote in this way. There are bill acceptors which use ultraviolet light to scan the inks, hidden line, or embossed stamp. However, these bill acceptors cannot eliminate the interference of ambient light. The interference of ambient light may cause a false determination. Further, because banknote issuing banks may frequently issue new banknotes with new counterfeit protection technology or arrangement to substitute for old banknotes. Ordinary people may not have sufficient knowledge to verify the authenticity of newly issued banknotes.

In order to help people verify the authenticity of different bills, the inventor invented a bill acceptor entitled "Infrared light ink image display device". This design of bill acceptor is functional. However, there is still room for improvement.

SUMMARY OF THE INVENTION

The present invention has been accomplished under the circumstances in view. It is the main object of the present invention to provide a bill acceptor, which uses infrared light to fetch the image of inks of the bill to be examined and ultraviolet light to scan fluorescent fibers of the bill, enabling the user to verify the authenticity of the bill accurately. It is another object of the present invention to provide a bill acceptor, which eliminates the interference of external light, improving the accuracy of the verification. According to one aspect of the present invention, the bill acceptor comprises a housing, the housing having a base for holding a banknote for examination, an infrared light emitter adapted to emit infrared light onto the banknote carried on the base of the housing for examination, an ultraviolet light emitter adapted to emit ultraviolet light onto the banknote for visual examination, an image sensor adapted to pick up infrared light reflected from the banknote carried on the base of the housing and to convert received light signal into image signal, and a display adapted to display image signal obtained from the image sensor for verifying the authenticity of the banknote. According to another aspect of the present invention, the housing comprises two light-tight side panels vertically disposed at two sides of the base and adapted to eliminate interference of external light.

DETAILED DESCRIPTION OF THE PREFERRED EMBODIMENT

Figure 1:
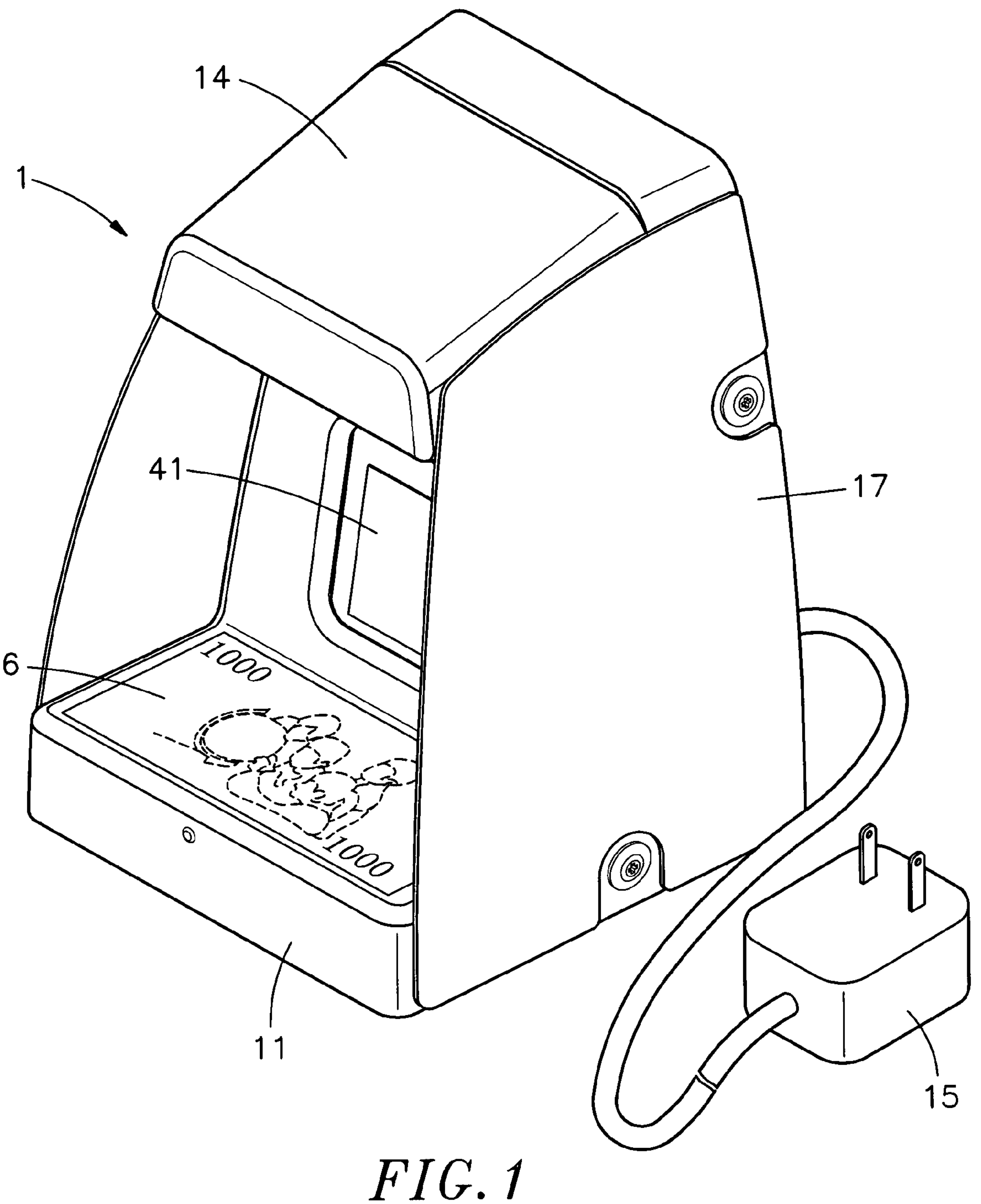
FIG. 1 is an elevational view of a bill acceptor according to the present invention.
Figure 2:
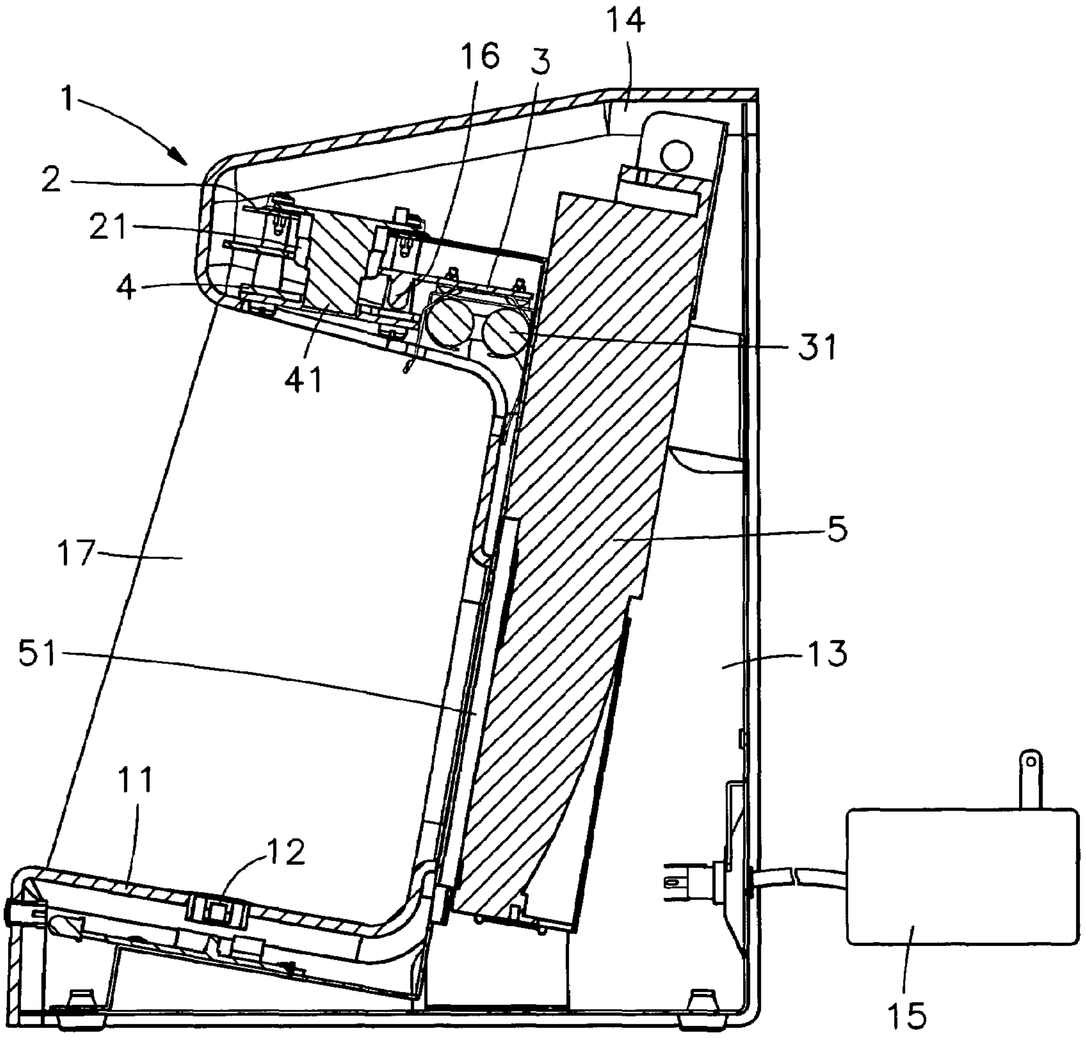
FIG. 2 is a side view in section of the bill acceptor according to the present invention.
Figure 3:
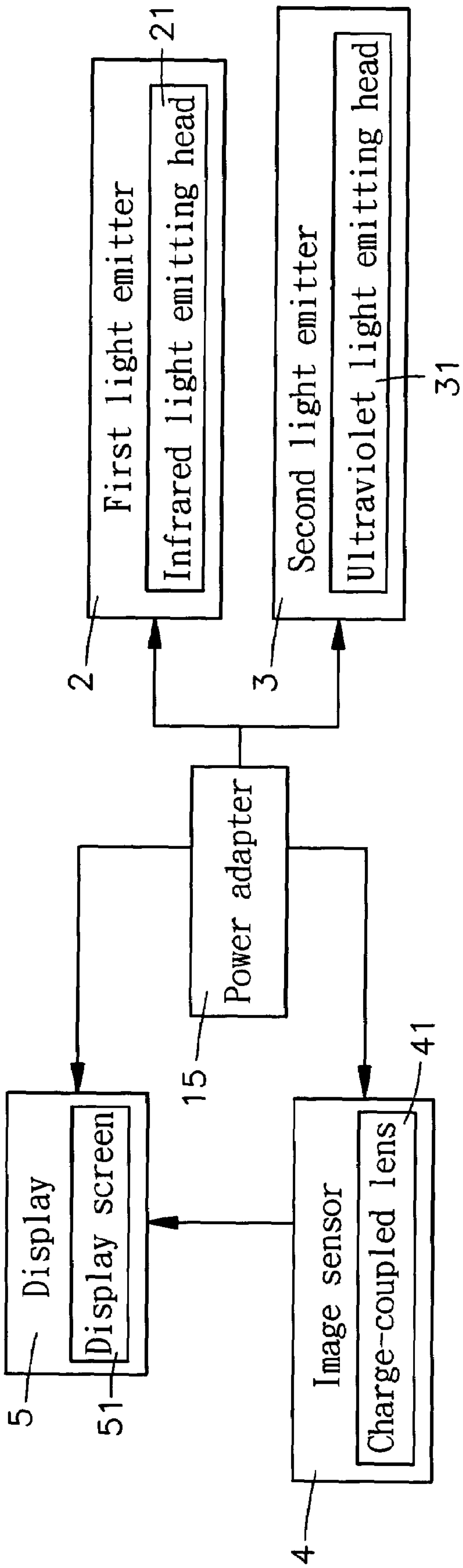
FIG. 3 is a system block diagram of the present invention.
Figure 4:
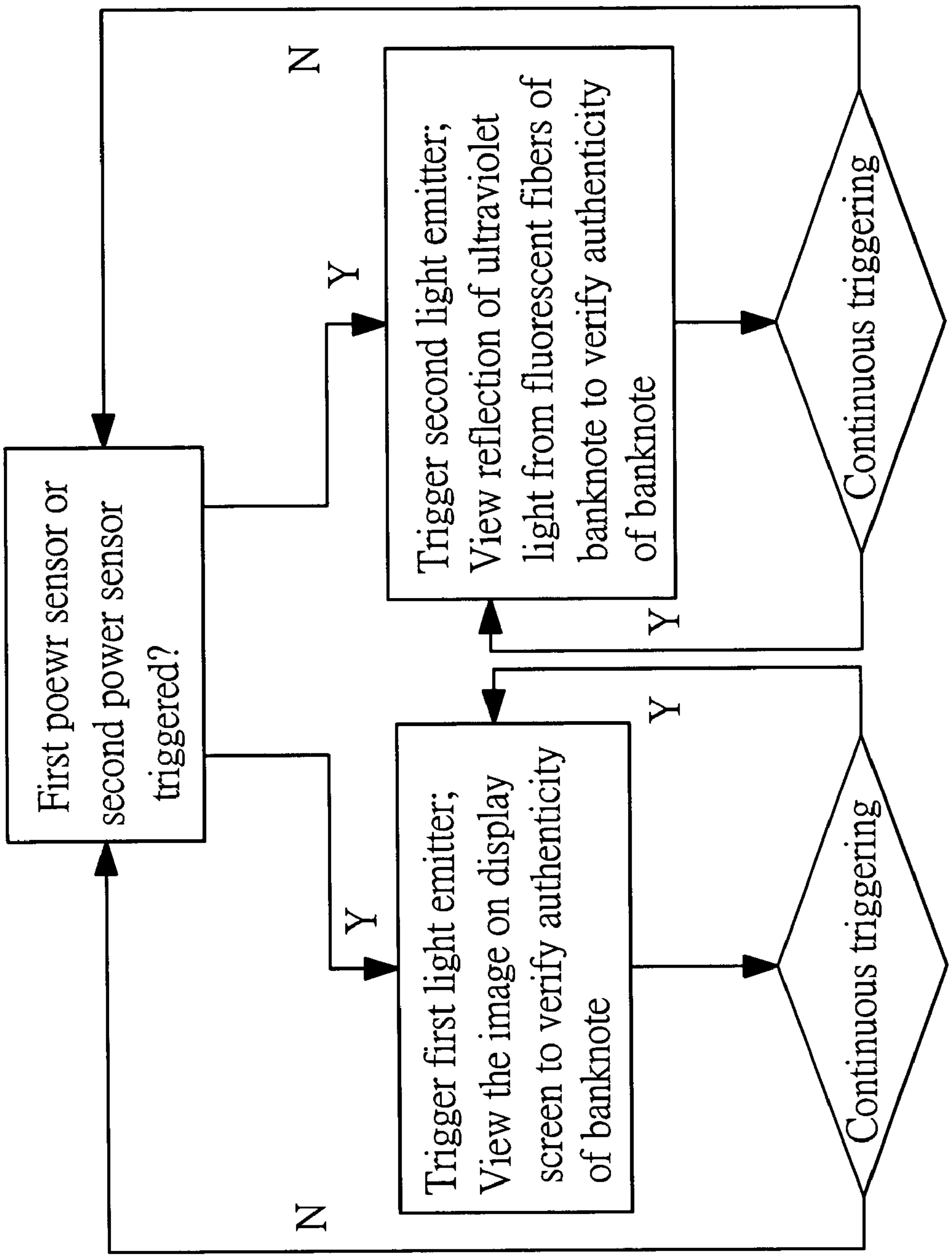
FIG. 4 is an operational flow of the present invention.

Referring to FIGS. 1~4, a bill acceptor is shown comprising of a housing 1 having installed therein a first light emitter 2, a second light emitter 3, an image sensor 4, and a display 5.

The housing 1 comprises a base 11 adapted to receive a banknote to be examined, a first power sensor 12 fastened pivotally with the base 11, a back 13 perpendicularly upwardly extended from the back side of the base 11, a top 14 horizontally forwardly extended from the top end of the back 13, a power adapter 15 provided at the back side of the back 13 and adapted to obtain the necessary electric energy from city power supply, a second power sensor 16 pivotally fastened to the top 14, and two light-tight side panels 17 bilaterally connected between the top 14 and the base 11.

The first light emitter 2 is installed in the top 14 of the housing 1, comprising an infrared light emitting head 21 aimed at the base 11 and adapted to emit infrared light the banknote 6 that is put on the base 11 for examination.

The second light emitter 3 is installed in the top 14 of the housing 1, comprising an ultraviolet light emitting head 31 aimed at the base 11 and adapted to emit ultraviolet light onto the banknote 6 for visual examination.

The image sensor 4 is installed in the top 14 of the housing 1, comprising a charge-coupled lens 41.

The display 5 is installed in the back 13 of the housing 1, comprising a display screen 51.

When in use, the banknote 6 to be examined is put on the base 11 inside the housing 1 above the first power sensor 12. At this time, the first power sensor 12 is triggered to start the first light emitter 2, the image sensor 4, and the display 5, thereby causing the first light emitter 2 to emit infrared light onto the banknote 6 and the image sensor 4 to pick up infrared light reflected by inks of the banknote 6 through the charge-coupled lens 41. When picked up reflected infrared light from the banknote 6, the image sensor 4 converts the light signal into image signal, enabling the image signal to be transmitted to the display 5 and then displayed on the display screen 51. Further, when the user lifting the banknote 6 from the base 11, the first light emitter 2 is turned off, and the image sensor 4 as well as the display 5 are turned off too. When the banknote 6 touching the second power sensor 16, the second light emitter 3 is started to emit ultraviolet light onto the banknote 6, thereby causing the fluorescent fibers in the banknote 6 to reflect ultraviolet light, and therefore the user can visually check the authenticity of the banknote 6. Further, because the side panels 17 are light tight, they eliminate interference of external visible light, assuring high accuracy of the examination of the bill acceptor.

Figure 5:
FIG. 5 illustrates the pattern of the printing of a banknote according to the present invention.
Figure 5A:
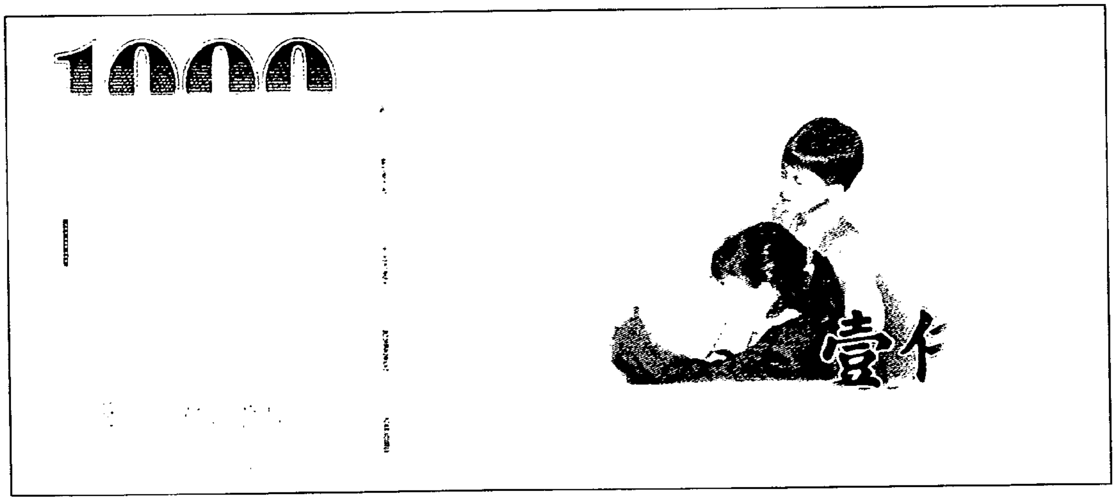
FIG. 5A illustrates the pattern of the image obtained from the banknote shown in FIG. 5 by the image sensor after radiation of infrared light according to the present invention.
Figure 6:
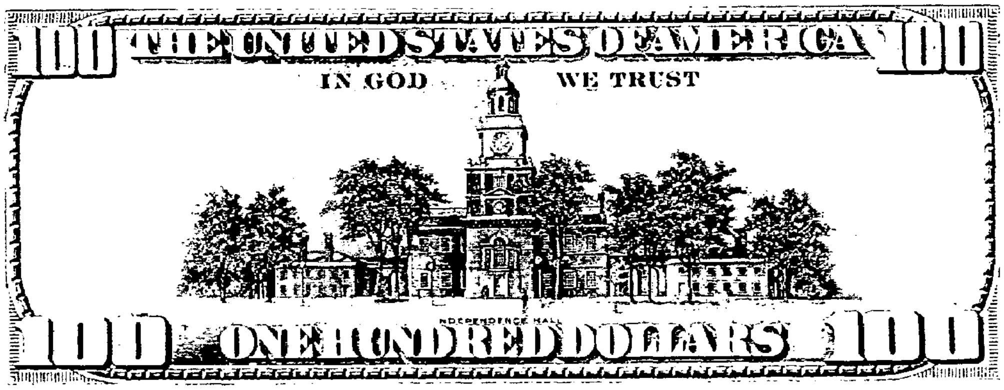
FIG. 6 illustrates the pattern of the printing of another banknote according to the present invention.
Figure 6A:
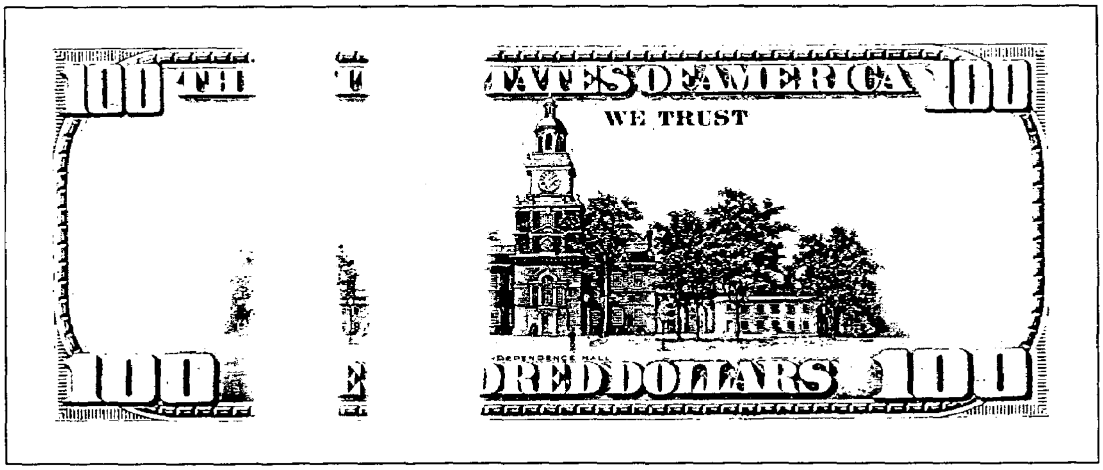
FIG. 6A illustrates the pattern of the image obtained from the banknote shown in FIG. 6 by the image sensor after radiation of infrared light according to the present invention.
Figure 7:
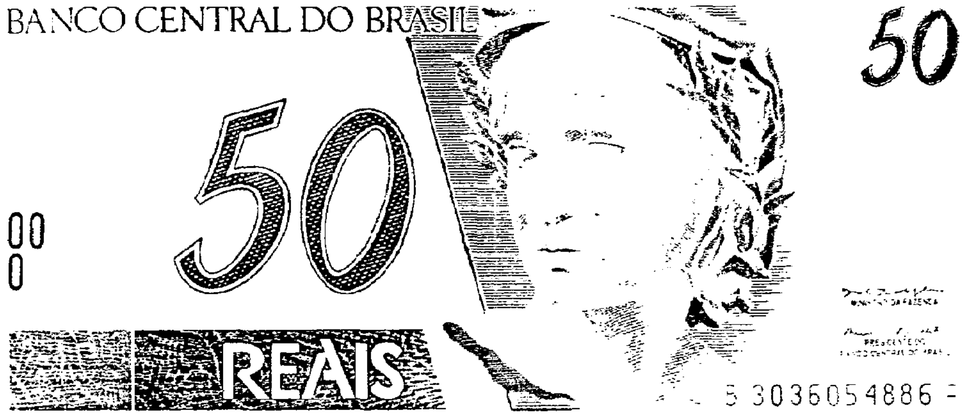
FIG. 7 illustrates the pattern of the printing of still another banknote according to the present invention.
Figure 7A:
FIG. 7A illustrates the pattern of the image obtained from the banknote shown in FIG. 7 by the image sensor after radiation of infrared light according to the present invention.

Referring to FIGS. 5, 5A, 6, 6A, 7, and 7A, banknotes 6 issued by banks in different countries are printed with different combinations of inks. Every kind of ink has a particular wavelength. When emitted infrared light onto a banknote 6, the inks of the banknote 6 absorb or reflect emitted infrared light, and the image sensor 4 receives reflected infrared light from the banknote 6 and then converts received light signal into image signal for verification.

A prototype of bill acceptor has been constructed with the features of FIGS. 1~7. The bill acceptor functions smoothly to provide all of the features discussed earlier.

Although a particular embodiment of the invention has been described in detail for purposes of illustration, various modifications and enhancements may be made without departing from the spirit and scope of the invention. For example, the housing of the bill acceptor can be made a table-top housing or mobile housing convenient for carrying by the user; battery power supply may be used instead of the power adapter to provide the bill acceptor with the necessary working voltage; switch means may be used to substitute for the power sensors. Further, the invention can be made in the form to verify the authenticity of banknotes, securities, stocks, passports, etc. Accordingly, the invention is not to be limited except as by the appended claims.

What is claimed is:

1. A bill acceptor comprising:

a housing, said housing comprising a base adapted to receive printed matter for examination;

a first light emitter adapted to emit infrared light onto the printed matter placed on said base of said housing for examination;

a second light emitter adapted to emit ultraviolet light onto the printed matter for visual examination;

an image sensor adapted to pick up infrared light reflected from the printed matter carried on the base of said housing for examination and to convert received light signal into image signal; and display means adapted to display image signal obtained from said image sensor.

2. The bill acceptor as claimed in claim 1, wherein said housing comprises a power adapter adapted to provide the necessary electricity to said first light emitter, said image sensor, and said display means.

3. The bill acceptor as claimed in claim 1, further comprising a first power sensor installed in said base of said housing and adapted to start said first light emitter, said image sensor and said display means when a printed matter carried on said base of said housing for examination.

4. The bill acceptor as claimed in claim 3, further comprising a second power sensor adapted to control the operation of said second light emitter and to turn off said first light emitter and said image sensor and said display means when triggered.

5. The bill acceptor as claimed in claim 1, wherein said first light emitter comprises an infrared light emitting head for output of infrared light.

6. The bill acceptor as claimed in claim 1, wherein said second light emitter comprises an ultraviolet light emitting head for output of ultraviolet light.

7. The bill acceptor as claimed in claim 1, wherein said image sensor comprises a charge-coupled lens.

8. The bill acceptor as claimed in claim 1, wherein said display means comprises a display screen for output of image signal obtained by said image sensor.

9. The bill acceptor as claimed in claim 1, wherein said housing comprises two light-tight side panels vertically disposed at two sides of said base.

10. The bill acceptor as claimed in claim 1, wherein said printed matter is a banknote.

11. The bill acceptor as claimed in claim 1, wherein said printed matter is a bond.

12. The bill acceptor as claimed in claim 1, wherein said printed matter is a passport.

* * * * *